W. MAUGHAN.
MUD GUARD FOR MOTOR CYCLES.
APPLICATION FILED DEC. 3, 1907.

902,592.

Patented Nov. 3, 1908.
2 SHEETS—SHEET 1.

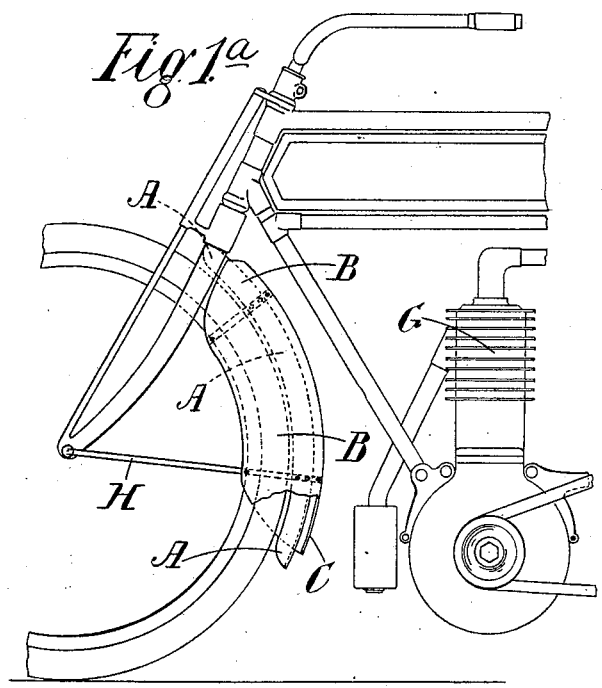

UNITED STATES PATENT OFFICE.

WALTON MAUGHAN, OF ALSTON, ENGLAND.

MUD-GUARD FOR MOTOR-CYCLES.

No. 902,592.

Specification of Letters Patent.

Patented Nov. 3, 1908.

Application filed December 3, 1907. Serial No. 404,963.

*To all whom it may concern:*

Be it known that I, WALTON MAUGHAN, a subject of the King of Great Britain, and resident of Alston, Northumberland, England, have invented a new and useful Mud-Guard for Motor-Cycles, of which the following is a specification.

This invention relates to mud guards for motor cycles and the like, and has for its object to provide an improved form of mud guard which shall give ample protection in wet weather, without creating unnecessary wind resistance.

A further feature is that the mud guard is caused to deflect air on to the air-cooled cylinder of a motor cycle engine, or elsewhere required; after the manner of the cowls or deflectors sometimes employed on motor cycles.

According to this invention, the mud guard is made in three strips, the central strip being of about the same width as the diameter of the tire, and the other two strips of any convenient width. The side strips are separated slightly from the central strip so as to leave a passage between the two, and the shape of this passage and the arrangement of the side strips are such that air is deflected through this passage, so that the front mud guard, instead of screening the engine, will assist in its cooling.

Figure 1:
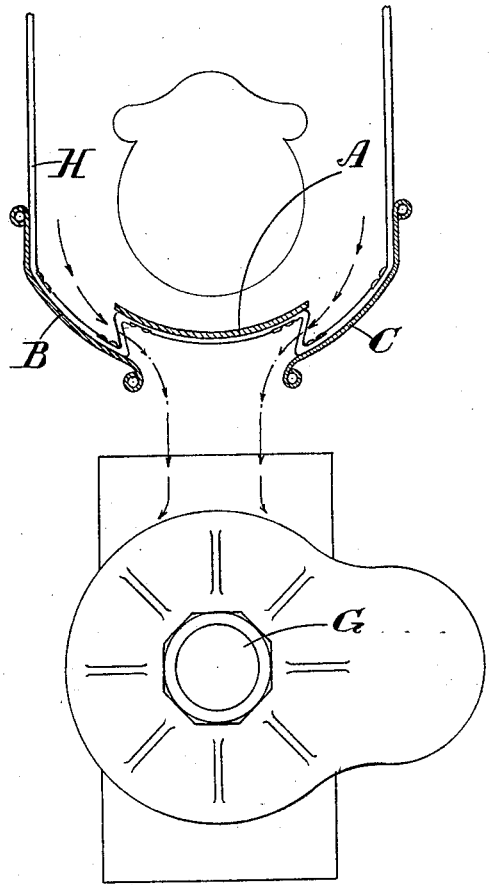
Figure 2:
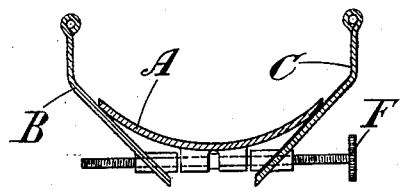

In the accompanying drawings, Figure 1 is a plan showing the application of the invention, and Fig. 1ª is a side elevation of a motor cycle, partly broken away, showing the invention in connection therewith. Fig. 2 is a view of a modified form of mud guard, adjustable according to this invention.

Like letters indicate like parts throughout the drawings.

The central strip A is preferably of about the same width as the cross section of the tire, and it may be supported by stays in the ordinary manner. The side strips B and C are attached to the central strip at the top and bottom, or elsewhere, as desired, as by riveting, but they are separated from the central strip throughout the greater part of their length especially in the neighborhood of the engine G, and those parts which require cooling. As the vehicle passes through the air the side strips B and C deflect air behind the central strip A and directly on to the engine, as shown by the arrows. Mud however strikes the central strip A and also the strips B and C, and does not impinge on the engine. The side strips may be supported from the central strip at two or three points, if necessary. Preferably the mud guard stays H are attached to the side strips B and C, and then extended across so as to support the central strip A, as shown in Fig. 1. This construction however is not essential.

If desired the side strips B and C may increase in width towards the bottom of the mud guard, this shape being found most efficient. It is not necessary that the side strips be carried the whole length of the mud guard as they can be mounted on the central strip only in the neighborhood of the engine cylinder G so that the air is deflected in the manner above described. These side strips can in this case be attached to existing mud guards with slight alterations. These side strips can be fixed in relation to the central strip, but, if desired, they can be collapsed so as to reduce or abolish the passage between the strips. For this purpose any convenient means may be employed, such as the turnbuckle shown in Fig. 2 which may be adapted to draw the side strips together until they meet the central strip and form a continuous mud guard. As an alternative the parts may be slotted out and set screws or bolts may be employed to lock them in the desired positions.

What I claim and desire to secure by Letters Patent is:—

1. In combination, a member to be cooled and a wheel mud guard adapted to deflect air thereon substantially as set forth.

2. In combination, a central wheel mud guard strip, side mud guard strips separated therefrom, and supports for said strips substantially as set forth.

3. In combination, a central wheel mud guard strip, side mud guard strips separated therefrom, and a stay supporting said strips substantially as set forth.

4. In combination, a central wheel mud guard strip, side mud guard strips separated therefrom, a stay supporting said strips, and means for adjusting said strips towards or away from one another, substantially as set forth.

In testimony whereof I have signed my name to this specification in the presence of two subscribing witnesses.

WALTON MAUGHAN.

Witnesses:
 JOHN T. FAZAKARLEY,
 HORACE D. TINGER.